(12) United States Patent
Okada et al.

(10) Patent No.: US 8,777,393 B2
(45) Date of Patent: *Jul. 15, 2014

(54) INK JET RECORDING METHOD

(71) Applicant: Seiko Epson Corporation, Tokyo (JP)

(72) Inventors: Hideki Okada, Shiojiri (JP); Masaru Kumagai, Shiojiri (JP); Takamasa Ikagawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/855,790

(22) Filed: Apr. 3, 2013

(65) Prior Publication Data

US 2013/0286118 A1 Oct. 31, 2013

Related U.S. Application Data

(63) Continuation of application No. 13/078,554, filed on Apr. 1, 2011, now Pat. No. 8,430,497.

(30) Foreign Application Priority Data

Apr. 1, 2010 (JP) .................................. 2010-085466

(51) Int. Cl.
*G01D 11/00* (2006.01)
*C09D 11/10* (2014.01)
*C09D 11/00* (2014.01)

(52) U.S. Cl.
CPC .............. *C09D 11/101* (2013.01); *C09D 11/30* (2013.01); *C09D 11/40* (2013.01)
USPC ........................................................ 347/100

(58) Field of Classification Search
CPC ...... G01D 11/00; C09D 11/101; C09D 11/30; C09D 11/40; C09D 11/322
USPC .............. 347/95, 100; 106/31.28, 31.59, 31.6
See application file for complete search history.

(56) References Cited

U.S. PATENT DOCUMENTS

| 5,958,121 | A | 9/1999 | Lin |
| 6,234,601 | B1 | 5/2001 | Hayashi et al. |
| 7,111,933 | B2 | 9/2006 | Morris et al. |
| 7,488,063 | B2 | 2/2009 | Yamashita et al. |
| 8,430,497 | B2 * | 4/2013 | Okada et al. .................. 347/100 |
| 2011/0234725 | A1 | 9/2011 | Wachi |
| 2011/0242196 | A1 | 10/2011 | Okada et al. |

FOREIGN PATENT DOCUMENTS

| JP | 11-323225 A | 11/1999 |
| JP | 2002-103638 A | 4/2002 |
| JP | 2005-154607 A | 6/2005 |
| JP | 2005-342897 A | 12/2005 |
| JP | 2008-213451 A | 9/2008 |
| JP | 2011-201037 A | 10/2011 |

* cited by examiner

*Primary Examiner* — An Do
(74) *Attorney, Agent, or Firm* — Nutter McClennen & Fish LLP

(57) ABSTRACT

An ink jet recording method includes ejecting at least two color ink compositions onto a recording medium so as to be deposited one on another. When one ink composition is deposited to form a first image and then another ink composition is deposited to form a second image on the first image, the ink composition forming the second image has a higher yield value than the ink composition forming the first image.

11 Claims, 3 Drawing Sheets

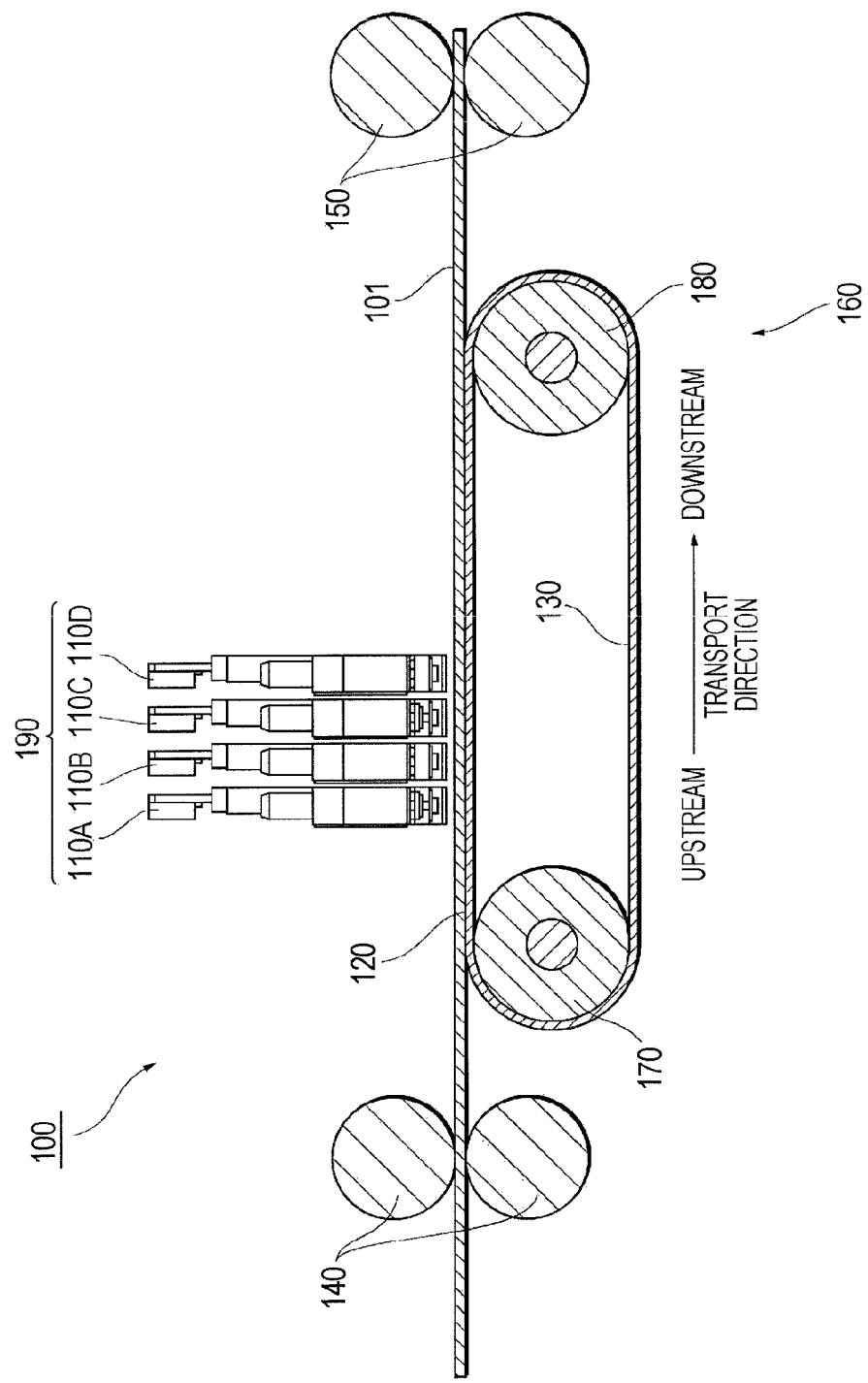

INK JET RECORDING METHOD

RELATED APPLICATIONS

The present application is a continuation of U.S. application Ser. No. 13/078,554, filed Apr. 1, 2011, now patented as U.S. Pat. No. 8,430,497, on Apr. 30, 2013 entitled "Ink Jet Recording Method," which claims priority to JP Appl. No. 2010-085466, filed Apr. 1, 2010, both applications of which are incorporated by reference in their entirety.

BACKGROUND

1. Technical Field

The present invention relates to an ink jet recording method.

2. Related Art

The ink jet recording method is a method for printing performed by ejecting droplets of an ink onto a recording medium, such as a paper sheet, from an ink jet head. The ink jet recording method is being innovatively developed and increasingly applied to high-resolution image recording (printing), which has been performed by photo printing and offset printing.

In one of the ink jet recording methods, a line head including ink nozzles arranged in a line ejects droplets of an ink onto a recording paper being transported at a speed corresponding to the ejection speed and volume of ink droplets. For example, JP-A 2002-103638 discloses a recording method using an ink jet printer including a recording head having ink nozzles through which an ink is ejected. This recording head is a line head in which lines of ink nozzles are arranged for respective color inks and extend in a direction perpendicular to the direction in which the recording medium is transported. The nozzle lines have spaces in the recording medium-transport direction between each color, and the nozzle lines for the respective color inks are arranged in the recording medium-transport direction in such a manner that the hue of the color ink at the upstream side of the transport direction is lighter than that of the downstream side.

The present inventors however found that this ink jet recording method causes color bleeding when at least two color inks are deposited on a recording medium in such a manner that one color ink overlies another. This color bleeding is a phenomenon in which adjacent different colors become indistinct, and is caused by the different colors spreading into each other to be mixed at the boundary between the different colors.

SUMMARY

Accordingly, an advantage of some aspects of the invention is that it provides an ink jet recording method that can prevent color bleeding when at least two color inks are deposited on a recording medium in such a manner that one color ink overlies another.

As a result of intensive research for a solution of the above issue, the present inventors found that whether color bleeding occurs depends upon the dynamic viscosity of an ink deposited on a recording medium or on an image formed immediately before the ink is deposited. The inventors have accomplished the invention through intensive research for an ink jet recording method capable of preventing color bleeding.

According to an aspect of the invention, an ink jet recording method is provided in which printing is performed by ejecting at least two color ink compositions onto a recording medium so as to be deposited one on another. When one ink composition is deposited to form a first image and then another ink composition is deposited to form a second image on the first image, the ink composition forming the second image has a higher yield value than the ink composition forming the first image.

In this method, the ink composition previously ejected to form the first image has a relatively high fluidity immediately after landing on a recording medium. However, the fluidity has been reduced when another ink composition is deposited. Therefore, even if another ink composition is deposited on the first image in such a state, color bleeding of the ink composition of the first image into the ink composition of the second image can be suppressed because of the low fluidity of the ink composition of the first image. On the other hand, the ink composition forming the second image originally has a high yield value, and its fluidity is low even immediately after it is deposited. Therefore, color bleeding of the ink composition of the second image into the ink composition of the first image can also be suppressed. Thus, the ink jet recording method can prevent the occurrence of color bleeding.

If the relationship of the yield values is reversed, that is, if the ink composition forming the second image has a lower yield value than the ink composition forming the first image, the fluidity of the first image is relatively low at the time when the ink composition of the first image is deposited, and the low fluidity continues until another ink composition is deposed to form the second image on the first image. Therefore, when another ink composition is deposited on the first image in such a state, color bleeding of the ink composition of the first image into the ink composition of the second image can be suppressed because of the low fluidity of the first image, as in the same mechanism as above. However, the ink composition forming the first image originally has a lower yield value, and its fluidity is high accordingly immediately after it is deposited. Consequently, color bleeding can occur from the ink composition of the first image to the ink composition of the second image. In this instance, unlike the case of the ink jet recording method of an embodiment of the invention, it is difficult to prevent the occurrence of color bleeding.

Preferably, the first image has a higher lightness than the second image. By ejecting ink compositions in decreasing order of lightness, an image formed particularly with an ink composition having a higher lightness can be prevented from being spread, in addition to the advantage of preventing the occurrence of color bleeding caused by depositing one ink composition on another. Accordingly, an image having a still higher sharpness can be formed by the ink jet recording method of an embodiment of the invention. For example, characters and lines formed with inks of cold colors, such as black and blue, which are often used in business application can be prevented from being spread into a background image formed with inks of warm colors, such as red and yellow, which are also often used, and consequently, it seems that an image having a high sharpness has been formed.

In an ink jet recording method of an embodiment of the invention, the color ink compositions include a black ink composition having a yield value $Y_K$, a cyan ink composition having a yield value $Y_c$, a magenta ink composition having a yield value $Y_M$, and a yellow ink composition having a yield value $Y_y$. The yield values of these ink compositions satisfy the relationship: $Y_K > Y_c > Y_M > Y_y$.

In an ink jet recording method of another embodiment of the invention, the color ink compositions include a black ink composition having a yield value $Y_K$, a magenta ink composition having a yield value $Y_M$, a cyan ink composition having a yield value $Y_c$, and a yellow ink composition having a yield value Yy. The yield values of these ink compositions satisfy the relationship: YK>YM>Yc>Yy.

These embodiments of the ink jet recording method can prevent the occurrence of color bleeding and can further form images having high sharpness.

BRIEF DESCRIPTION OF THE DRAWINGS

The invention will be described with reference to the accompanying drawings, wherein like numbers reference like elements.

FIG. 3 is a schematic sectional view taken along line III-III shown in FIG. 2.

DESCRIPTION OF EXEMPLARY EMBODIMENTS

Figure 1:
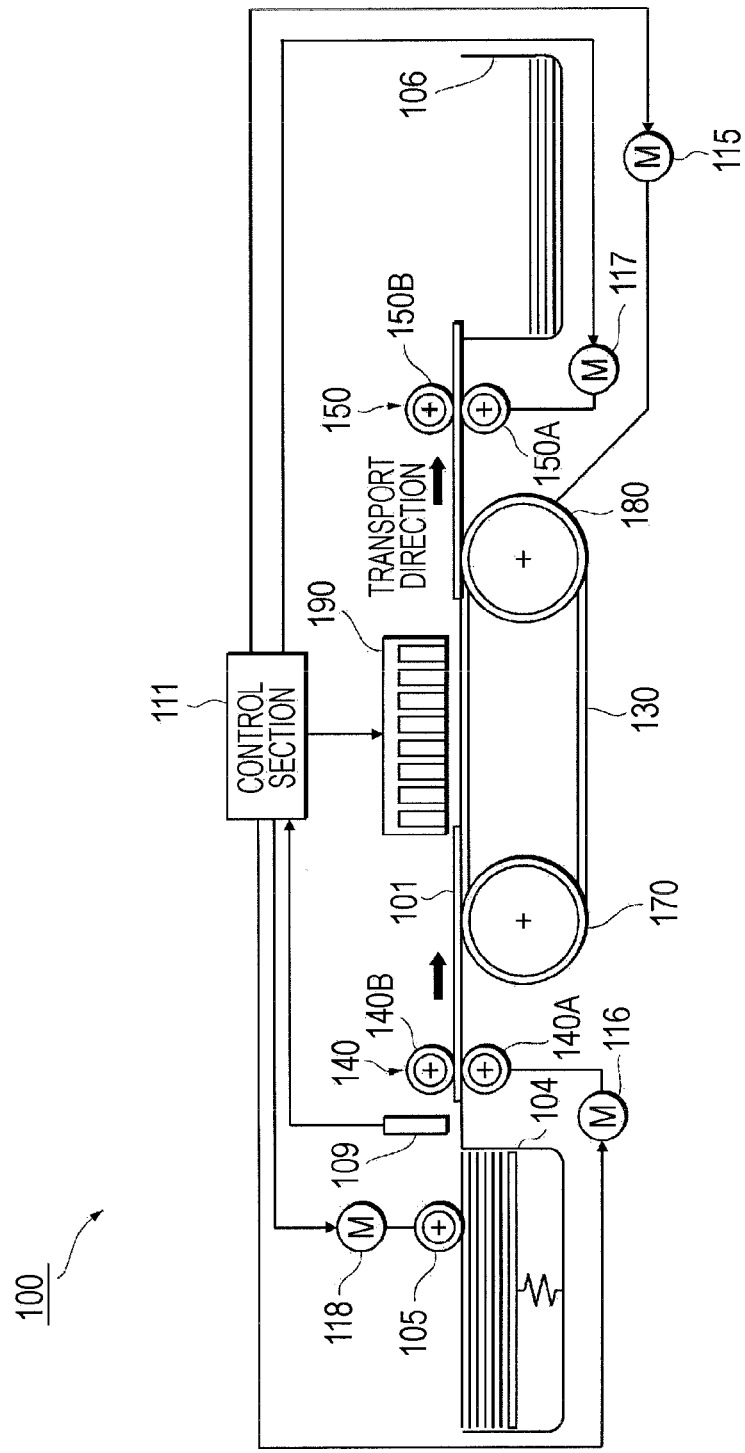
FIG. 1 is a schematic view of an ink jet recording apparatus used in an embodiment of the invention.

Embodiments of the invention will now be described in detail with reference to the drawings. However, the invention is not limited to the embodiments. Also, various modifications may be made without departing from the scope and spirit of the invention. In the drawings, the same elements are designated by the same reference numerals and the same description will not be repeated. The relative positions and other positional relationship accord with the drawings unless otherwise specified. The dimensional proportions in the drawings are not limited to those shown in the drawings.

In an ink jet recording method according to an embodiment of the invention, printing is performed by ejecting at least two color ink compositions to form respective images on a recording medium so as to be deposited one on another. When one ink composition is deposited to form a first image and then another ink composition is deposited to form a second image on the first image, the ink composition forming the second image has a higher yield value than the ink composition forming the first image. The yield value and residual viscosity mentioned herein are determined as below. First, the shear rate of the ink composition at 20° C. is varied and the relationship between the shear rate and the shear stress is measured. Subsequently, the yield value and residual viscosity are calculated by applying the measured values to Casson Equation:

$$S = a \times D + b$$

In the Casson Equation, S represents the shear stress (unit: Pa), D represents the shear rate (unit: 1/s), and a and b each represent a constant. Non-Newtonian fluid liquids, many of which apply to the Casson equation, are used in considerably broad fields. The square of slope a represents the residual viscosity, and the square of intercept b represents the yield value. These are property values of a liquid. As is clear from the Casson equation, the residual viscosity refers to the viscosity at infinite shear rate, and the yield value refers to the stress at a shear rate of zero.

Figure 2:
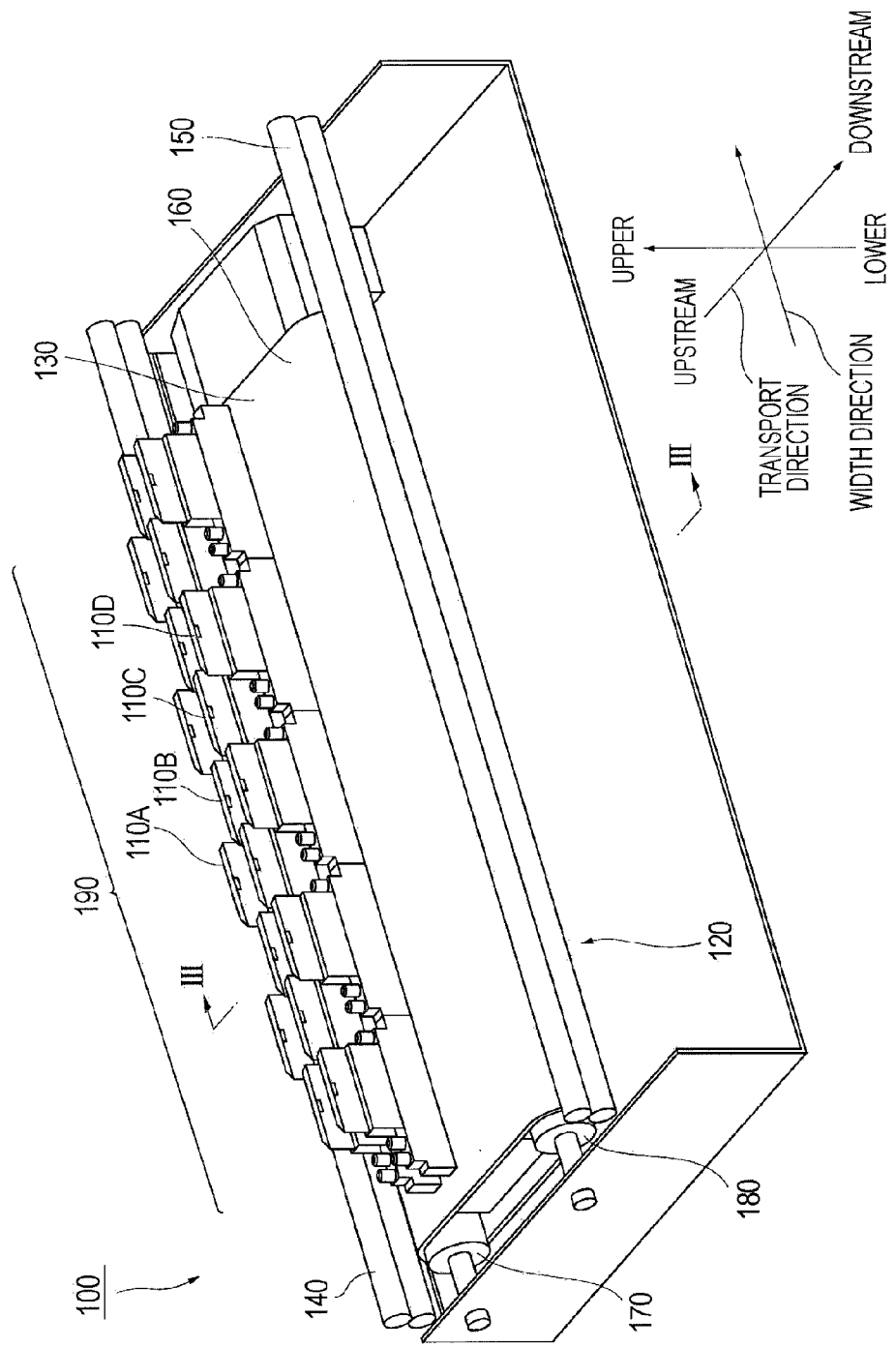
FIG. 2 is a schematic perspective view of a part of an ink jet recording apparatus used in an embodiment of the invention.

An ink jet recording apparatus used in the ink jet recording method of the present embodiment may have the structure shown in FIGS. 1, 2 and 3. FIG. 1 is a schematic view of the ink jet recording apparatus, particularly showing the paper transport portion, and FIG. 2 is a perspective view of a part of the recording apparatus. FIG. 3 is a schematic sectional view of the ink jet recording apparatus taken along line III-III in FIG. 2, showing a state in which a recording medium, such as plain paper, is transported.

The plain paper mentioned herein refers to a non-coated paper mainly made from pulp and used in printers or the like. More specifically, plain papers include woodfree paper defined as No 6074 in JIS P 0001, PPC paper defined as No. 6139 in JIS P 0001, and other non-coated printing papers. Commercially available papers such as Xerox 4200 (manufactured by Xerox) and GeoCycle (produced by Gerogia-Pacific) may be used as plain paper.

The ink jet recording apparatus will be described with reference to FIG. 1, first. A line ink jet recording apparatus 100 capable of high-speed high density printing typically includes an ink jet head unit 190 that ejects droplets of ink compositions (hereinafter may be referred to as ink droplets) onto a recording medium 101, such as plain paper, to records images, a transport belt 130 that transports the recording medium 101 to a position under the ink jet head unit 190, an accommodating cassette 104 in which the recording medium 101 is accommodated, a paper feed roller 105 that feeds the recording medium 101 from the accommodating cassette 104, a pair of transport rollers (gate rollers) 140 for transport the recording medium 101, a pair of ejection rollers 150 for ejecting the recording medium 101, a paper ejection cassette 106 that receives the printed recording medium 101, a control section 111, and a position detecting sensor 109 that detects the position of the recording medium 101.

The ink jet head unit 190 includes a plurality of ink jet heads 110A, 110B, 110C and 110D (or 110A to 110D, these reference numerals are not shown in FIG. 1) corresponding to the respective types of ink. Each ink jet head is a line head having many ink ejection nozzles arranged in the width direction of the recording medium 101 across the entire width.

The transport belt 130, which is a ring, transports the recording medium 101 to the position of the ink jet head unit 190 (printing region). A driving roller 180 drives the transport belt 130 and a driven roller 170 is driven so as to oppose the transport belt 130 to ink-ejection ports of the ink jet head unit 190. The driving roller 180 is operated by a motor 115 controlled by the control section 111. The paper feed roller 105 is intended to send the recording medium 101 in the accommodating cassette 104 to the transport rollers 140, and are operated by a motor 118 controlled by the control section 111.

The transport rollers 140 include a driving roller 140A acting as a roller unit operated by a motor 116 controlled by the control section 111, and a driven roller 140B driven by contact with the driving roller 140A. The ejection rollers 150 constitute an ejection roller pair including a driving roller 150A operated by a motor 117 controlled by the control section 111, and a driven roller 150B driven by contact with the driving roller 150A.

The control section 111 includes a CPU (central processing unit) that performs printing operation (recording operation) and other operations, a RAM (random access memory) module that stores printing data (recording data) transmitted from a host computer through an interface (IF) in a data storage region or temporarily stores other data, and a PROM or EEPROM (electrically erasable programmable read-only memory) module that stores a control program or the like for controlling various portions.

A position-detecting sensor 109 is a reflective photosensor prepared by, for example, combining an IR emitting diode acting as a light-emitting device, and a phototransistor acting as a light-receiving element. The position detecting sensor 109 is disposed at a paper transport portion between the paper feed roller 105 and the transport rollers 140, and detects the front end position of the transported recording medium 101 (the presence or absence of the recording medium 101). The detection signal of the sensor is transmitted to the control section 111. The control section 111 controls the transport rollers 140 according to the detection signal of the front end of the recording medium 101.

The recording medium 101 is transported to the transport rollers 140 rotated by the motor 116 operated according to a driving signal from the control section 111 to come into contact with the transport rollers 140. Consequently, the position and orientation of the front end of the recording medium 101 are aligned by the contact of the front end with the transport rollers, so that the recording medium 101 is pinched between the driving roller 140A and the driven roller 140B and sent onto the transport belt 130. When the recording medium 101 is transported to the printing region under the ink jet head unit 190 by the transport belt 130, ink droplets are ejected onto the recording medium 101 being transported on the transport belt 130 from the nozzles of the ink jet head unit 190. Thus printing is performed according to printing data.

For printing on the recording medium 101, in the control section 111, the RAM module receives printing data from a host computer through the interface, and the CPU processes the data in a predetermined manner. According to the processed data, a driving signal is outputted to the head driver and then inputted to the ink jet head unit 190. Consequently, an electrostatic actuator to which the driving signal has been inputted operates so that ink droplets are ejected to print (record) an image according to the printing data onto the recording medium 101 through the corresponding nozzles.

The printed recording medium 101 is transported to the ejection portion (ejection rollers 150) by the transport belt 130. When the transported recording medium 101 has been reached the ejection rollers 150, the motor 117 rotates the driving roller 150A according to a driving signal from the control section 111, and the recording medium 101 is pinched between the driving roller 150A and the driven roller 150B rotated by the contact with the driving roller 150A and thus transported into the paper ejection cassette 106.

Turning to FIGS. 2 and 3, the present embodiment will be further described. The ink jet recording apparatus 100 includes the ink jet head unit 190, a platen portion 120 disposed under the ink jet head unit 190 so as to oppose each other, a recording medium feed portion (not shown) that feeds the recording medium 101 at the upstream side of the platen portion 120 in the transport direction, a recording medium receiving portion (not shown) that receives the printed recording medium 101 at the downstream side of the platen portion 120 in the transport direction, and a transport unit 160 that transports the recording medium 101 over the platen portion 120 from the recording medium feed portion and further transports the recording medium 101 to the recording medium receiving portion after being printed.

The ink jet head unit 190 includes a plurality of lines of ink jet heads 110A to 110D having ink nozzles. Each line includes a plurality of the same ink jet heads so that the ink nozzles are arranged in a line. The ink jet heads 110A to 110D are arranged in a staggered manner in such a manner that each line of the same ink jet heads extends in a direction perpendicular to the recording medium-transport direction (in the width direction of the recording medium 101) for line printing.

The two lines of the ink jet heads 110A and 110B eject droplets of the same first ink composition, and the other lines, the two lines of the ink jet heads 110C and 110D, eject droplets of the same second ink composition. The color of the first ink composition ejected from the ink jet heads 110A and 110B is different from the color of the second ink composition ejected from the ink jet heads 110C and 110D. The ink jet heads 110A and 110B are overlapped with each other when viewed from the recording medium-transport direction so that the first ink composition can form an image at any position across the width of the recording medium. The ink jet heads 110C and 110D are also arranged in the same manner.

Preferably, the distance between the line of the ink jet heads 110A and the line of the ink jet heads 110B is the same as the distance between the line of the ink jet head 110B and the line of the ink jet heads 110C, and/or the distance between the line of the ink jet heads 110C and the line of the ink jet heads 110D is the same as the distance between the ink jet heads 110B and the line of the ink jet heads 110C. In the known technique, this arrangement is difficult. The arrangement in which the distance between ink jet head lines of different colors is approximately the same as the distance between ink jet head lines of the same color causes color bleeding particularly in high speed printing. On the other hand, the present embodiment allows the ink jet heads to be arranged in such a manner that the distance between the ink jet head lines of different colors is smaller than or equal to the distance between the ink jet head lines of the same color, because the embodiment can reduce the occurrence of color bleeding, as described below. In addition, since the length of the entire ink jet head unit 190 in the transport direction can be reduced, the apparatus can be reduced in size, weight, and cost. Furthermore, in the present embodiment, the displacement of dots in the width direction, which occurs when the recording medium 101 is skewed in its width direction, can be minimized by reducing the distance between the lines of different color heads.

The platen portion 120 includes a transport belt 130 on which the recording medium 101 is transported. The transport belt 130 doubles as a platen belt. The transport unit 160 includes the transport belt 130 and the pairs of transport rollers 140 and ejection rollers 150 respectively disposed at the upstream side and the downstream side of the transport belt 130 in the transport direction. The rollers of each pair oppose each other so as to pinch the recording medium 101 from the vertical direction. The transport belt 130 is operated so as to transport the recording medium 101 thereon in the transport direction by the rotation of the driven roller 170 and the driving roller 180.

The other portion of the ink jet recording apparatus 100 may have the same structure as the known apparatus.

The operation of the ink jet recording apparatus 100, that is, the ink jet recording method, is performed as below. First, the transport unit 160, that is, the transport belt 130 and the transport rollers 140 and 150, are operated to transport the recording medium 101 in the transport direction from the medium feed portion to the platen portion 120. When the recording medium 101 has transported to the position under the ink jet heads 110A and 110B, droplets of the first ink composition are ejected from the nozzles of the ink jet heads 110A and 110B. The droplets are landed on desired positions on the printing surface (top surface) of the recording medium 101 where images are to be formed. Subsequently, when the recording medium 101 has transported to the position under the ink jet heads 110C and 110D, droplets of the second ink composition are ejected from the nozzles of the ink jet heads 110C and 110D. The droplets are landed on desired positions on the printing surface (top surface) of the recording medium 101 where images are to be formed. At this time, part of the second ink composition may land directly on the printing surface of the recording medium 101, and at least part of the second ink composition lands on the image formed with the first ink composition. Thus an image is formed on the recording medium 101. The recording medium 101 on which the image has been formed (printed) is transported to the medium receiving portion disposed downstream from the ink jet head unit 190.

The technique as described above is hereinafter called "color completion method", in which a color ink composition is deposited on all the portions where an image of this color is to be formed, and subsequently another color ink composition is ejected on all the positions where another image of this color is to be formed.

In the ink jet recording method of the present embodiment, an ink composition is ejected as droplets from fine nozzles and deposited on a recording medium. Techniques for this method will now be described in detail.

A first technique is electrostatic suction. In this technique, a strong electric field is applied between a nozzle and an acceleration electrode disposed in front of the nozzle so that ink droplets are continuously ejected from the nozzle. A printing information signal is applied to deflecting electrodes while the droplets fly between deflecting electrodes, and recording is thus performed. The droplets may be deposited according to the printing information signal without deflecting the ink droplets.

A second technique is a method for forcibly ejecting ink droplets by applying a pressure to a liquid ink composition with a small pump and mechanically vibrating the nozzle with a quartz resonator or the like. The ink droplets are charged simultaneously with being ejected, and recording is performed by applying a printing information signal to the deflecting electrodes while the ink droplets fly between the deflecting electrodes.

A third technique uses a piezoelectric element. A pressure and a printing information signal are simultaneously applied to a liquid ink composition by the piezoelectric element. Thus recording is performed by ejecting ink droplets for recording.

In a fourth technique, the volume of the liquid ink composition is rapidly expanded by thermal energy. The ink composition is bubbled by being heated with a small electrode according to a printing information signal, and is thus ejected for recording.

Any of the above techniques can be applied to the ink jet recording method of the present embodiment.

The ink compositions (first and second ink compositions) used in the ink jet recording method of the present embodiment will now be described.

From the viewpoint of safety and handling, aqueous ink compositions mainly containing water as the main solvent are preferably used in the present embodiment. The water is preferably pure water or ultra pure water, such as ion exchanged water, ultrafiltered water, reverse osmosis water, or distilled water. In particular, the water is preferably sterilized by, for example, uv irradiation or addition of hydrogen peroxide. The use of sterile water can prevent the occurrence of mold or bacteria and thus allows long-term storage. From the viewpoint of ensuring appropriate physical properties (yield value, viscosity, etc.), stability and reliability of the ink composition, it is preferable that the ink composition contain 10% to 60% by mass of water.

By controlling the water content in the ink composition in the above range, the amount of water absorbed to the cellulose of plain paper is reduced. Accordingly, the swelling of the cellulose, which is considered to be a cause of cockling and curling, can be prevented. The properties of preventing cockling and curling are referred to as anti-cockling property and anti-curling property, respectively.

If the water content is less than 10% by mass, the fixability to the recording medium may be reduced. In contrast, if the water content is more than 60% by mass, cockling or curling is liable to occur as in use of known aqueous ink compositions, when printing is performed on a recording medium having an absorption layer on a paper support that cannot absorb ink much.

The viscosity of the ink composition at a temperature in the range of 10 to 40° C. is varied depending on the temperature dependences of the coloring agent, moisturizing agent, solvent and other constituents in the ink composition. Among these constituents, the moisturizing agent has a large effect, and tends to increase the viscosity at 10° C. and to reduce the viscosity at 40° C., depending on the material and the amount added or content. In the description herein, when the difference in viscosity between temperatures of 10° C. and 40° C. is small, it is said that the ink composition has a good viscosity property with temperature.

Preferably, the ink composition used in the present embodiment contains at least one moisturizing agent selected from the group consisting of the following groups (A), (B) and (C), from the viewpoint of maintaining a suitable balance among the anti-cockling property, the anti-curling property, the strike-through property, the anti-clogging property, and the viscosity property with temperature. Moisturizing agent (A) is at least one compound selected from group (A) consisting of glycerin, 1,2,6-hexanetriol, diethylene glycol, triethylene glycol, tetraethylene glycol and dipropylene glycol. Moisturizing agent (B) is at least one compound selected from group (B) consisting of trimethylolpropane and trimethylolethane. Moisturizing agent (C) is at least one compound having a molecular weight in the range of 100 to 200 selected from group (C) consisting of betaines, saccharides and urea compounds.

Moisturizing agent (A) is effective particularly in suppressing clogging, and also in suppressing curling and cockling. This moisturizing agent however can penetrate the recording medium, and is accordingly inferior in strike-through property. From the viewpoint of ensuring the above advantage, glycerin and triethylene glycol are preferred as moisturizing agent (A).

Moisturizing agent (B) is effective in suppressing clogging and is superior in strike-through property because it has the effect of suppressing penetration. From the viewpoint of ensuring these advantages, trimethylolpropane is preferred as moisturizing agent (B).

Moisturizing agents (A) and (B) each have a large difference between the viscosities at temperatures of 10° C. and 40° C. Accordingly the viscosity property with temperature of the ink composition is more significantly affected and, thus, the viscosity of the ink composition has a large difference between temperatures of 10° C. and 40° C., as the content of the moisturizing agents is increased in the ink composition.

Moisturizing agent (C) is superior in anti-curling property and anti-cockling property. This moisturizing agent is also superior in viscosity property with temperature. Examples of moisturizing agent (C) include betaines that are N-trialkyl-substituted compounds of amino acids, such as glycine betaine (molecular weight: 117, may be referred to as trimethylglycine), γ-butyrobetaine (molecular weight: 145), homarine (molecular weight: 137), trigonelline (molecular weight: 137), carnitine (molecular weight: 161), homoserine betaine (molecular weight: 161), valine betaine (molecular weight: 159), lysine betaine (molecular weight: 188), ornithine betaine (molecular weight: 176), alanine betaine (molecular weight: 117), stachydrine (molecular weight: 185), and betaine glutamate (molecular weight: 189); saccharides, such as glucose (molecular weight: 180), mannose (molecular weight: 180), fructose (molecular weight: 180), ribose (molecular weight: 150), xylose (molecular weight: 150), arabinose (molecular weight: 150), galactose (molecular weight: 180), and sorbitol (molecular weight: 182); and urea compounds, such as allylurea (molecular weight: 100), N,N-dimethylolurea (molecular weight: 120), malonylurea (molecular weight: 128), carbamylurea (molecular weight: 103), 1,1-diethylurea (molecular weight: 116), n-butylurea (molecular weight: 116), creatinine (molecular weight: 113), and benzylurea (molecular weight: 150). If the molecular weight of moisturizing agent (C) is less than 100, the difference between the viscosities at temperatures of 10° C. and 40° C. tends to be increased. On the other hand, if the molecular weight is 200 or more, the viscosity of the ink composition is likely to increase with respect to the content of moisturizing agent (C) in the ink composition. Accordingly, the molecular weight of moisturizing agent (C) is preferably in the range of 100 to 200. Among the above compounds, glycine betaine is particularly suitable because it is highly effective in suppressing curling, and is commercially available as, for example, AMINOCOAT from Asahi Kasei Chemicals.

The total content of moisturizing agents (A), (B) and (C) in the ink composition is preferably in the range of 10% to 40% by mass, from the viewpoint of the anti-curling property, the anti-cockling property, the strike-through property, and the anti-clogging property.

Preferably, the proportion of moisturizing agents on a mass basis is (A):(B):(C)=(1.0):(0.1 to 1.0):(1.0 to 3.5), from the viewpoint of producing the above-described advantageous effects of the moisturizing agent with a good balance. If the ink composition contains two moisturizing agents selected from groups (A), (B) and (C), the mass ratio of moisturizing agents is preferably (A):(B)=(1.0):(0.1 to 1.0), (A):(C) (1.0):(1.0 to 3.5), or (B):(C)=(1.0):(1.0 to 3.5), from the same viewpoint as above. If the mass ratio of moisturizing agent (B) to moisturizing agent (A) is higher than the above ratio, the anti-curling property and anti-cockling property are degraded. If it is lower than the above ratio, the strike-through property is degraded. If the mass ratio of moisturizing agent (C) to moisturizing agent (A) is higher than the above ratio, the anti-clogging property is degraded. If it is lower than the above ratio, it becomes difficult particularly to prevent the nonuniformity in image density, and the anti-curling property and anti-cockling property are degraded. If the mass ratio of moisturizing agent (C) to moisturizing agent (B) is higher than the above ratio, the anti-clogging property is degraded. If it is lower than the above ratio, it becomes difficult to control the nonuniformity in image density, and the anti-curling property and anti-cockling property are degraded.

Preferably, the ink composition used in the present embodiment contains a water-soluble organic solvent in order to prevent clogging in the vicinity of the nozzles of the ink jet head, to control the penetration and bleeding of the ink composition into the recording medium, and to make the ink composition easy to dry. Accordingly, the water-soluble organic solvent preferably contains 1,2-alkanediol and/or glycol ether. Examples of 1,2-alkanediol include 1,2-octanediol, 1,2-hexanediol, 1,2-pentanediol, and 4-methyl-1,2-pentanediol. Examples of glycol ether include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol mono-n-butyl ether (TEGmBE),1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether. In addition, 2-pyrrolidone, N-methyl-2-pyrrolidone and the like can also be used as the water-soluble organic solvent. These water-soluble organic solvents are used singly or in combination, and their total content in the ink composition is preferably 1% to 50% by mass, from the viewpoint of ensuring appropriate physical properties (yield value, viscosity, etc.) of the ink composition, and ensuring high print quality and reliability.

In order to control the wettability of the ink composition to the recording medium so as to ensure the penetration into the recording medium and the printing stability in the ink jet recording method, the ink composition preferably contains a surface tension modifier. Preferred surface tension modifiers include acetylene glycol-based surfactants and polyether-modified siloxanes. Examples of the acetylene glycol-based surfactant include Surfinols 420, 440, 465, 485 and 104 and Surfinol STG (each product name, produced by Air Products), and Olfines PD-001, SPC, E1004 and E1010 (each product name, produced by Nissin Chemical Industry), and Acetylenols EOO, E40, E100 and LH (each product name, produced by Kawaken Fine Chemical). Examples of the polyether-modified siloxane include BYK-346, BYK-347, BTK-348 and BYK-UV 3530 (each produced by BYK). These surface tension modifiers can be used singly or in combination in the ink composition, and are contained in such an amount as can control the surface tension of the ink composition in the range of 20 to 40 mN/m, and preferably contained in an amount of 0.1% to 3.0% by mass in the ink composition.

The ink composition may contain a pH adjuster, a complexing agent, an antifoaming agent, an antioxidant, an ultraviolet light absorbent, a preservative, an antifungal agent and other additives, if necessary. Examples of the pH adjuster include alkali metal hydroxides, such as lithium hydroxide, potassium hydroxide, and sodium hydroxide; and ammonia and alkanolamines, such as triethanolamine, tripropanolamine, diethanolamine, and monoethanolamine. Preferably, the ink composition is adjusted to a pH of 6 to 10 by adding at least one pH adjuster selected from the group consisting of alkali metal hydroxides, ammonia, triethanolamine, and tripropanolamine. If the pH of the ink composition is outside this range, the materials of the ink jet printer are likely to be adversely affected, and the printer becomes difficult to recover from clogging.

The pigment used in the ink composition used in the present embodiment may be a known inorganic or organic pigment. Examples of such a pigment include Pigment Yellows, Pigment Reds, Pigment Violets, Pigment Blues and Pigment Blacks that can be designated by color index numbers, and also include phthalocyanine-based pigments, azo-based pigments, anthraquinone-based pigments, azomethine-based pigments, and pigments having a condensed ring. Other pigments may also be used, including organic pigments, such as Yellow Nos. 4, 5, 205 and 401, Orange Nos. 228 and 405, and Blue Nos. 1 and 404; and inorganic pigments, such as carbon black, titanium oxide, zinc oxide, zirconium oxide, iron oxide, ultramarine blue, iron blue, and chromium oxide. Pigments designated by color indexes include C. I. Pigment Yellows 1, 3, 12, 13, 14, 17, 24, 34, 35, 37, 42, 53, 55, 74, 81, 83, 95, 97' 98, 100, 101, 104, 108, 109, 110, 117' 120, 128, 138, 150, 153, 155, 174, 180 and 198, C. I. Pigment Reds 1, 3, 5, 8, 9, 16, 17, 19, 22, 38, 57:1, 90, 112, 122, 123, 127, 146, 184 and 202, C.I. Pigment Violets 1, 3, 5:1, 16, 19, 23 and 38, C. I. Pigment Blues 1, 2, 15, 15:1, 15:2, 15:3, 15:4 and 16, and C. I. Pigment Blacks 1 and 7. These pigments may be contained singly or in combination in the ink composition.

The pigment used in the present embodiment is preferably dispersed in resin from the viewpoint of controlling the yield value so as to have an appropriate relationship with the yield values of other ink compositions. Accordingly, the pigment is preferably added to the ink composition as a pigment-dispersed liquid. The pigment-dispersed liquid may be prepared by dispersing a pigment with a dispersant, such as a polymer dispersant or a surfactant, in an aqueous medium using a ball mill, a roll mill, a bead mill, a high-pressure homogenizer, a high-speed agitating disperser or the like. A self-dispersing pigment prepared by binding a group that can impart dispersion characteristics (hydrophilic functional group and/or its salt) to the surfaces of the pigment particles directly or with an alkyl, alkyl ether or aryl group or the like therebetween may be dispersed or dissolved in an aqueous medium without using a dispersant. The pigment-dispersed liquid thus prepared is added to the ink composition. Preferably, a pigment-dispersed liquid in which a self-dispersing pigment is dispersed in an aqueous medium is used from the viewpoint of controlling the yield value so as to have an appropriate relationship with the yield values of other ink compositions.

Examples of the polymer dispersant include natural polymer dispersants, such as glue, gelatin and saponin; and synthetic polymer dispersants, such as polyvinyl alcohols, polypyrrolidones, acrylic resins (polyacrylic acid, acrylic acid-acrylonitrile copolymer, vinyl acetate-acrylic acid copolymer, vinyl acetate-acrylic ester copolymer, etc.), styrene-acrylic acid resins (styrene-acrylic acid copolymer, styrene-methacrylic acid copolymer, styrene-methacrylic acid-acrylic acid alkyl ester copolymer, styrene-a-methylstyrene-acrylic acid copolymer, styrene-a-methylstyrene-acrylic acid-acrylic acid alkyl ester copolymer, styrene-vinyl acetate-acrylic acid copolymer, etc.), styrene-maleic acid resins, vinyl acetate-fatty acid vinyl-ethylene copolymers, and salts of these resins. These copolymers may be of random, block or graft type.

Surfactants that can be used as the dispersant include anionic surfactants, such as fatty acid salts, higher alkyl dicarboxylic acid salts, higher alcohol sulfates, and higher alkyl sulfonates; cationic surfactants, such as fatty acid amine salts and fatty acid ammonium salts; and nonionic surfactants, such as polyoxyalkyl ethers, polyoxyalkyl esters, and sorbitan alkyl esters.

Among those dispersants, water-insoluble resins are particularly preferred. Preferably, an exemplary water-insoluble dispersant is a block copolymer of a monomer having a hydrophobic group and a monomer having a hydrophilic group (hydrophilic functional group), including a group capable of forming a salt, and having a solubility of less than 1 g in 100 g of water at 25° C. after neutralization. Examples of the monomer having a hydrophobic group include methacrylic acid esters, such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters, such as vinyl acetate; vinyl cyanides, such as acrylonitrile and methacrylonitrile; and aromatic vinyl monomers, such as styrene, a-methylstyrene, vinyltoluene, 4-t-butylstyrene, chlorostyrene, vinyl anisole, and vinyl-naphthalene. These monomers may be used singly or in combination. Examples of the monomer having a hydrophilic group include polyethylene glycol monomethacrylate, polypropylene glycol monomethacrylate, and ethylene glycol-propylene glycol monomethacrylate. These monomers may be used singly or in combination. Examples of the monomer having a group capable of forming a salt include acrylic acid, methacrylic acid, styrene-carboxylic acid, and maleic acid. These monomers may be used singly or in combination. In addition, macromonomers, whose one end has a polymerizable functional group, such as styrene-based macromonomers and silicone-based macromonomers, and other monomers may be combined.

The water-insoluble resin is preferably used in form of a salt that has been neutralized with an alkaline neutralizer, such as ethylamine, a tertiary amine such as trimethylamine, lithium hydroxide, sodium hydroxide, potassium hydroxide, or ammonia, and preferably has a weight average molecular weight of about 10,000 to 150,000 from the viewpoint of stably dispersing the pigment.

The self-dispersing pigment, which can be dispersed or dissolved in water without using a dispersant, can be prepared by, for example, being subjected to physical treatment or chemical treatment for binding (grafting) a group capable of imparting dispersion characteristics or an active species having a group capable of imparting dispersion characteristics to the surfaces of the pigment particles. For the physical treatment, vacuum plasma treatment may be performed. The chemical treatment may be performed by, for example, wet oxidation in which the surfaces of the pigment particles are oxidized with an oxidizing agent in water, or a process in which a compound having a phenyl group and at least two hydrophilic groups is bound to the surfaces of the pigment so that the hydrophilic groups are bound to the surfaces of the pigment with the phenyl group there between. For example, the compound having a phenyl group and at least two hydrophilic groups may be p-aminobenzoic acid or sulfanilic acid. If p-aminobenzoic acid is used, its carboxyl group is bound to the surfaces of the pigment with the phenyl group there between. If sulfanilic acid is used, its sulfoxy group or a salt with its sulfoxyl group (for example, sodium persulfate or a sodium salt derived from sodium persulfate) is bound to the surfaces of the pigment with a phenyl group there between. Among these, self-dispersing pigments whose surfaces are bound with a hydrophilic group with a phenyl group there between are preferred from the viewpoint of the stability in viscosity with time of the ink composition and the prevention of sedimentation resulting from the aggregation of the pigment.

Since ink compositions containing a self-dispersing pigment do not require a dispersant to disperse the pigment, the defoaming property of the ink composition is not degraded by a dispersant. Accordingly, the ink composition is hardly foamed and is easy to prepare so as to have a high ejection stability. Also, since a significant increase in viscosity caused by a dispersant can be suppressed, the pigment content can be increased to increase the print density, or the handling of the ink composition can be easy. Since self-dispersing pigments have these advantages, they are useful for black ink compositions, which are required to form dense images. The black ink composition used in the present embodiment preferably contains a self-dispersing pigment capable of being dispersed or dissolved in water without using a dispersant.

In the present embodiment, a self-dispersing pigment that can be surface-treated by oxidation with a hypohalous acid and/or hypohalous acid salt, a persulfate, or ozone is preferred from the viewpoint of high color developability. By this surface treatment, a hydrophilic group is introduced to the self-dispersing pigment. Self-dispersing pigments that can be surface-treated by oxidation with a persulfate or ozone, particularly self-dispersing pigments that can be surface-treated by oxidation with ozone, are preferred from the viewpoint of (1) preventing the increase in viscosity of the ink composition when the materials are compounded, (2) preventing sedimentation resulting from the aggregation of the pigment, and (3) maintaining the advantages of (1) and (2) for the long term. Commercially available self-dispersing pigments may be used. Exemplary commercially available self-dispersing pigments include Microjet CW-1 (product name, produced by Orient Chemical Industries), and CAB-O-JET200 and CAB-O-JET 300 (each product name, produced by Cabot).

Preferably, the pigment in the ink composition has a volume average particle size in the range of 50 to 200 nm from the viewpoint of the storage stability of the ink composition and the prevention of nozzle clogging. The volume average particle size can be measured with Microtrac UPA 150 (manufactured by Microtrac) or a particle size distribution analyzer LPA 3100 (manufactured by Otsuka electronics).

Preferably, the ink composition contains 6% to 25% by mass of pigment. If the pigment content is less than 6% by mass, the print density (color developability) can be insufficient. If the pigment content is more than 25% by mass, problems with reliability may occur, such as nozzle clogging or unstable ejection.

Preferably, the ink composition used in the present embodiment contains a resin emulsion from the viewpoint of ensuring a fixability to recorded matter. The resin emulsion preferably contains resin particles having a minimum film forming temperature of less than 20° C. By using resin particles having a minimum film forming temperature of less than 20° C. as the resin emulsion, the resin particles can be formed into a film at temperatures (typically 20° C. or more) in use, and thus, the fixability of the ink composition to the recording medium and the rub fastness of the composition can be enhanced.

The minimum film forming temperature can be measured as below. First, a resin emulsion is applied at a thickness of 0.3 mm onto a stainless steel plate of a thermal gradient tester. The coated stainless steel plate is immediately placed on a plate in a basket containing silica gel and covered with a transparent plastic cover. After the coating is dried, the temperature at a boundary between the portion of a uniformly formed coating and the portion of a clouded coating is measured. The measured temperature is the minimum film forming temperature.

Preferably, the resin emulsion contains particles of at least one resin selected from the group consisting of acrylic resins, methacrylic resins, vinyl acetate resins, vinyl chloride resins, and styrene-acrylic resins. These resins may be homopolymer or copolymer, or have a single-phase structure or a multiphase (core-shell) structure.

Furthermore, it is preferable that at least any one of the resin emulsions added to the ink composition be an emulsion of resin particles prepared by emulsion polymerization of an unsaturated monomer. If resin particles are added singly to the ink composition, they may not be sufficiently dispersed. It is preferable to add resin particles in form of emulsion from the viewpoint of the manufacture of the ink composition. From the viewpoint of the storage stability of the ink composition, acrylic resin emulsion is preferably used.

Resin emulsion such as acrylic resin emulsion can be prepared by a known emulsion polymerization. For example, an unsaturated monomer, such as unsaturated vinyl monomer, can be subjected to emulsion polymerization in water containing a polymerization initiator and a surfactant.

Unsaturated monomers conventionally used for emulsion polymerization can be used as the unsaturated monomers, and examples of such an unsaturated monomer include acrylic ester monomers, methacrylic ester monomers, aromatic vinyl monomers, vinyl ester monomers, vinyl cyanide monomers, halogenated monomers, olefin monomers, and diene monomers.

More specifically, exemplary unsaturated monomers include acrylic esters, such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic esters, such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters, such as vinyl acetate; vinyl cyanides, such as acrylonitrile and methacrylonitrile; halogenated monomers, such as vinylidene chloride and vinyl chloride; aromatic vinyl monomers, such as styrene, a-methylstyrene, vinyltoluene, 4-t-butylstyrene, chlorostyrene, vinylanisole, and vinylnaphthalene; olefins, such as ethylene and propylene; dienes, such as butadiene and chloroprene; vinyl monomers, such as vinyl ether, vinyl ketone, and vinyl pyrrolidone; unsaturated carboxylic acids, such as acrylic acid, methacrylic acid, itaconic acid, fumaric acid, and maleic acid; acrylamide compounds, such as acrylamide, methacrylamide, and N,N'-dimethylacrylamide; and hydroxy group-containing monomers, such as 2-hydroxyethyl acrylate, 2-hydroxypropyl acrylate, 2-hydroxyethyl methacrylate, and 2-hydroxypropyl methacrylate. These unsaturated monomers may be used singly or in combination.

In addition, polymerizable crosslinking monomers having at least two double bonds may be used as the unsaturated monomer. Exemplary polymerizable crosslinking monomers having at least two double bonds include diacrylate compounds, such as polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, and 2,2'-bis(4-acryloxydiethoxyphenyl)propane; triacrylate compounds, such as trimethylolpropane triacrylate, trimethylolethane triacrylate, and tetramethylolmethane triacrylate; tetraacrylate compounds, such as ditrimethylol tetraacrylate, tetramethylolmethane tetraacrylate, and pentaerythritol tetraacrylate; hexaacrylate compounds, such as dipentaerythritol hexaacrylate; dimethacrylate compounds, such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,T-bis(4-methacryloxydiethoxyphenyl) propane; trimethacrylate compounds, such as trimethylolpropane trimethacrylate and trimethylolethane trimethacrylate; methylenebisacrylamide; and divinylbenzene. These compounds may be used singly or in combination.

In addition to the polymerization initiator and surfactant used for the emulsion polymerization, a chain transfer agent, a neutralizer and others may be used according to conventional processes. In particular, preferred neutralizers include ammonia, inorganic alkali metal hydroxides, such as sodium hydroxide and potassium hydroxide.

In the present embodiment, it is preferable that the resin emulsion be added so that the resin particle content in the ink composition is in the range of 1% to 10% by mass, from the viewpoint of ensuring physical properties of the ink composition suitable for the ink jet method, reliability (anti-clogging property and ejection stability) and fixability of the ink composition.

Preferably, the resin emulsion in the ink composition has a volume average particle size of 20 to 200 nm from the viewpoint of the dispersion stability of the resin particles in the ink composition.

In the ink jet recording method of the present embodiment, the yield value of the second ink composition ejected from the ink jet heads 110C and 110D is set so as to be higher than that of the first ink composition ejected from the ink jet heads 110A and 110B. In order to control the yield values of the ink compositions as above, preferably, an ink composition containing a pigment having high color developability in a low content is used as the first ink composition, and an ink composition containing a pigment having low color developability in a high content is used as the second ink composition. To control the yield values of the ink composition, alternatively, a surfactant, a dispersant or a rheology controlling agent may be added to the ink composition, or the content of theses additives may be adjusted. The rheology controlling agent contains inorganic particles exhibiting structural viscosity, such as colloidal silica, or contains a component insoluble or hardly soluble in a solvent such as modified urea and urea-modified urethane. Commercially available rheology controlling agents include, for example, BYK rheology controlling agents, such as BYK-405, BYK-420, BYK-425 and BYK-428 (each product name).

When the yield values of the first and second ink compositions are controlled as above, the first ink composition ejected from the ink jet heads 110A and 110B onto the recording medium 101 exhibits a relatively high fluidity immediately after landing on the recording medium 101. However, the fluidity of the image of the first ink composition has been reduced when the second ink composition is ejected from the ink jet heads 110C and 110D and deposited on the recording medium. Therefore, even if the second ink composition lands on the image in such a state, color bleeding of the first ink composition to the second ink composition can be suppressed because of the low fluidity of the first ink composition. Since the second ink composition originally has a high yield value and its fluidity is low even immediately after landing, color bleeding of the second ink composition to the first ink composition can also be suppressed. Thus, the ink jet recording method of the present embodiment can prevent the occurrence of color bleeding. Furthermore, since the yield values are controlled as above, color bleeding can be prevented even if the viscosities of the ink compositions are comparable to each other. Accordingly, the ejection property of ink droplets from the nozzles can be controlled to be the same among the ink jet heads 110A to 110D, and the occurrence of clogging can be suppressed.

If the yield value of the first ink composition that is previously ejected is lower, the first ink composition is spread to some extent out of the portion intended to be printed. However, the undesirably spread portion of the first ink composition can be hidden by depositing the second ink composition there. Since the second ink composition has a higher yield value and accordingly does not much spread after landing, it can be selectively printed only on a desired portion. Furthermore, even if the print position of the first ink composition is displaced, the first ink composition spreads to the position intended to be printed, after landing. The displaced position of the first ink composition can be canceled so as to be obscure by printing the second ink composition without displacement.

In the present embodiment, the first ink composition and the second ink composition are printed by the color completion method. The color completion method is performed in such a manner that the recording medium 101 and the ink jet heads 110A and 110B are relatively moved in a single pass, and the same color ink composition is not deposited on the same position. Accordingly, this method has the advantages of: (1) allowing high-speed printing; and (2) allowing ink jet heads and their unit to be reduced in size and weight to reduce the cost, because there is no need of ink jet heads or nozzle lines for depositing the same ink composition several times on the same position.

In the ink jet recording method of the present embodiment, preferably, the image formed with the first ink composition has a higher lightness than the image formed with the second ink composition. Although color bleeding is suppressed in the present embodiment, color bleeding generally can occur more from the first ink composition than from the second ink composition. Accordingly, if the lightness of the image formed with the first ink composition is increased more, color bleeding from the first ink composition, even if occurs, can be canceled to the extent that it is not distinguished. In general, ink compositions having low lightnesses are required to form finer images. Since the second ink composition having a lower lightness has a higher yield value, the image (lines and characters) of the second ink composition is advantageously suppressed from spreading after landing, and thus can form a fine image. Ink compositions having low lightnesses such as a black ink composition are often printed independently on a recording medium such as plain paper. By controlling the lightness of the second ink composition having a higher yield value, feathering can be prevented when the second ink composition is independently printed.

In a combination of the first ink composition and the second ink composition, the first ink composition may have a color other than black, and the second ink composition has black color. In another combination, a magenta or yellow ink composition may be used as the first ink composition, and a cyan ink composition may be used as the second ink composition. A cyan or yellow first ink composition and a magenta second ink composition may be combined.

The ink jet recording method of the present invention produces a recorded material. This recorded material has a sharp image without color bleeding because of the advantages of the ink jet method of the present embodiment. The image of the recorded material has few missing dots because it has been formed by depositing ink compositions having stable fixability and not causing clogging on a recording medium, as intended recorded material, the ink is safe and stable, and the quality of the record can be maintained on various types of recording medium independently of temperature in use. If plain paper is used, the recorded material is superior in anti-curling, anti-cockling and strike-through property, and may have images on both sides of the recording material.

Thus, an embodiment of the invention has been described. The invention is not limited to the embodiment disclosed above. Also, various modifications may be made without departing from the scope and spirit of the invention. Although the above embodiment has disclosed a structure in which ink jet heads 110A to 110D are arranged in a staggered manner, the ink jet heads may be arranged in a different manner.

However it is preferable that the ink jet heads be arranged in a staggered manner so as to partially overlap with each other when viewed in the transport direction, because such an arrangement allows printing without a space between each color line.

Although the above embodiment has disclosed an ink jet recording method using two color ink compositions, the method of another embodiment may use three or more color ink compositions, such as three, four, five or six color ink compositions. In such a case, it is preferable that a plurality of ink jet heads for other colors are disposed downstream from the inkjet head 110D in the same manner as the ink jet heads 110A and 110B.

If the ink compositions include four color ink compositions of black, cyan, magenta and yellow, preferably, they are arranged in decreasing order of lightness from the upstream side of the transport direction, for example, in order of yellow ink composition, magenta ink composition, cyan ink composition and black ink composition. In this instance, preferably, the yield values of the ink compositions satisfy the relationship YK>Yc>YM>Yy. The reason of this is the same as in the above embodiment using two color ink compositions. In the relationship, YK, Yc, YM and Yy represent the yield values of the black ink composition, the cyan ink composition, the magenta ink composition and the yellow ink composition, respectively.

Alternatively, the four color ink compositions may be arranged in decreasing order of lightness from the upstream side of the transport direction, for example, in order of yellow ink composition, cyan ink composition, magenta ink composition and black ink composition. In this instance, preferably, the yield values of the ink compositions satisfy the relationship YK>YM>Yc>Yy. The reason of this is the same as in the above embodiment using two color ink compositions. In the relationship, YK, YM, Yc and Yy represent the yield values of the black ink composition, the magenta ink composition, the cyan ink composition and the yellow ink composition, respectively.

EXAMPLES

The invention will be further described in detail with reference to Examples. The invention is however not limited to the examples.

Preparation of Coloring Agent
Self-Dispersing Pigment to which a Hydrophilic Group is Bound with a Phenyl Group there Between Pigment-Dispersed Liquid CA A 4 L stainless steel beaker was placed on a rotor-stator type high shear mixer L4RT-A (product name, manufactured by SILVERSON) and immersed in an ice bath. The beaker was charged with about 75 g of C. I. Pigment Blue 15:4 and 1000 g of water, and the materials were mixed to be homogenized by stirring at 7200 rpm for 15 minutes. To the mixture were added 20 mL of a solution of 2.07 g (0.01 mol) of o-acetaniside in isopropanol, followed by stirring for 15 minutes.

In another vessel, a diazonium salt was produced by mixing 4.35 g (0.025 mol) of sulfanilic acid, 30 mL of 1 N HCl, and 1.73 g (0.025 mol) of sodium nitrite at 5 to 10° C. The diazonium salt was added to the mixture of C. I. Pigment Blue 15:4 and o-acetaniside with stirring, and the temperature was maintained at about 10° C. The resulting mixture was adjusted to a pH of 5 to 6 by dropping 5 M sodium hydroxide solution, and was stirred for 2 hours while the progress of the reaction was being checked according to the presence or absence of the diazonium salt. If the diazonium salt is present, when one droplet each of the reaction mixture and 1 M Na2C03 solution containing 0.1% of aminosalicylic acid has been dropped on filter paper, the two droplets come into contact with each other and turn orange.

The mixture was placed in a Telsonic flow-type ultrasonic apparatus and subjected to ultrasonic treatment for 2 hours. The resulting pigment-dispersed liquid was purified through a 50 nm diafiltration membrane column, and concentrated to a solid content of 20% by mass to yield cyan pigment-dispersed liquid CA.

Pigment-Dispersed Liquid MA

Magenta pigment-dispersed liquid MA containing 20% by mass of solid content was prepared in the same manner as in the preparation of cyan pigment-dispersed liquid CA, except that C. I. Pigment Red 122 was used as the pigment instead of C. I. Pigment Blue 15:4.

Pigment-Dispersed Liquid YA

Yellow pigment-dispersed liquid YA containing 20% by mass of solid content was prepared in the same manner as in the preparation of cyan pigment-dispersed liquid CA, except that C. I. Pigment Yellow 74 was used as the pigment instead of C. I. Pigment Blue 15:4.

Pigment-Dispersed Liquid KC

Black pigment-dispersed liquid KC containing 20% by mass of solid content was prepared in the same manner as in the preparation of cyan pigment-dispersed liquid CA, except that C. I. Pigment Black 7 (carbon black) was used as the pigment instead of C. I. Pigment Blue 15:4.

Self-Dispersing Pigment to which Hydrophilic Group has been Bound by Oxidation with Persulfate Pigment-Dispersed Liquid KA To 3 L of 2 N sodium persulfate solution was added 150 g of a carbon black, Color Black S170 (product name, produced by Degussa), and the carbon black was oxidized by stirring the mixture at an agitation speed of 1 s-1 at 60° C. for 10 hours. The oxidized carbon black was filtered through an ultrafiltration membrane AHP-1010 (manufactured by Asahi Kasei) to remove residual salts. Then, an aqueous solution of sodium hydroxide was added to adjust the pH to 8. Subsequently, ultrafiltration was performed again for purification by removing excess salts and for concentration by removing water. In this operation, the carbon black content was adjusted so that the solution after treatment would contain 20% by mass of carbon black. Thus black pigment-dispersed liquid KA was prepared.

Self-Dispersing Pigment to which Hydrophilic Group has been Bound by Oxidation with Ozone Pigment-Dispersed Liquid KB To 500 g of water was added 20 g of a carbon black, Color Black S170 (product name, produced by Degussa). The mixture was dispersed in a home mixer for 5 minutes. To the resulting dispersion was dropped 1400 g of sodium hypochlorite (effective chlorine concentration: 12%). The mixture was subjected to reaction for 5 hours while being pulverized in a ball mill and further boiled for 4 hours for wet oxidation. The resulting liquid was filtered through a glass fiber filter GA-100 (product name, available from Advantech Toyo), followed by washing with water. The resulting wet cake was dispersed in 5 kg of water and purified by deionization through a reverse osmosis membrane until the electric conductivity was reduced to 2 mS/cm. Further, the dispersion was concentrated to a pigment concentration of 20% by mass to yield pigment-dispersed liquid KB. The volume average particle size of the pigment in this dispersion liquid was measured with Microtrac UPA 150 (produced by Microtrac). The result was 110 nm.

Pigment-Dispersed Liquid CB

Cyan pigment-dispersed liquid CB containing 20% by mass of solid content was prepared in the same manner as in the preparation of black pigment-dispersed liquid KB, except that C. I. Pigment Blue 15:4 was used as the pigment instead of carbon black.

Pigment-Dispersed Liquid YB

Yellow pigment-dispersed liquid YB containing 20% by mass of solid content was prepared in the same manner as in the preparation of black pigment-dispersed liquid KB, except that C. I. Pigment Yellow 74 was used as the pigment instead of carbon black.

Preparation of Ink Composition

Constituents of each ink composition were mixed in a proportion shown in Table 1, and the mixture was filtered through a membrane filter of 10 m in pore size to yield an ink composition. Each content shown in Table 1 is on the percent by mass basis, and "balance" in the row of ion exchanged water means that ion exchanged water was added to a total of 100% by mass. "Newrex Soft 5S" is a surfactant produced by NOF Corporation.

Evaluation of Ink Compositions

Test 1: Yield Value

Each ink composition was placed in a cone/plate (diameter: 75 mm, angle: 1°) attached to a viscoelasticity analyzer Physica MCR301 (product name) manufactured by Anton Paar, and the shear viscosity of the ink composition was measured at 20° C. with respect to the shear rate (10 to 1000s-1). The obtained shear viscosity was applied to the Casson equation to calculate the yield value. The results are shown in Tables 3 to 5.

Test 2: Lightness

Each ink set was separately loaded in a line ink jet printer having the same structure as the printer shown in FIGS. 1 to 3 except that an ink jet head unit capable of using four color ink compositions was used, and a patch pattern (solid image) was printed at a duty of 100% with the cyan, magenta, yellow and black ink compositions. Plain paper Xerox P (manufactured by Fuji Xerox) and Xerox 4024 (manufactured by Xerox) were used as recording media. The resulting printed material was allowed to stand under normal conditions for an

TABLE 1

|  | Cyan ink composition | | Magenta ink composition | Yellow ink composition | | | Black ink composition | | |
| --- | --- | --- | --- | --- | --- | --- | --- | --- | --- |
|  | C1 | C2 | M1 | Y1 | Y2 | Y3 | K1 | K2 | K3 |
| Cyan pigment-dispersed liquid CA | 50 | — | — | — | — | — | — | — | — |
| Cyan pigment-dispersed liquid CB | — | 50 | — | — | — | — | — | — | — |
| Magenta pigment-dispersed liquid MA | — | — | 50 | — | — | — | — | — | — |
| Yellow pigment-dispersed liquid YA | — | — | — | 50 | — | — | — | — | — |
| Yellow pigment-dispersed liquid YB | — | — | — | — | 50 | 50 | — | — | — |
| Black pigment-dispersed liquid KA | — | — | — | — | — | — | 35 | — | — |
| Black pigment-dispersed liquid KB | — | — | — | — | — | — | — | 35 | — |
| Black pigment-dispersed liquid KC | — | — | — | — | — | — | — | — | 35 |
| Glycerin | 8 | 8 | 8 | 8 | 8 | 8 | 8 | 8 | 8 |
| Triethylene glycol | 5 | 5 | 5 | 5 | 5 | 5 | 5 | 5 | 5 |
| 1,2-Hexanediol | 5 | 5 | 5 | 5 | 5 | 5 | 5 | 5 | 5 |
| Trimethylolpropane | 3 | 3 | 3 | 3 | 3 | 3 | 3 | 3 | 3 |
| TEGmBE | 15 | 15 | 15 | 15 | 15 | 15 | 20 | 20 | 15 |
| Olfine E1010 | 0.5 | 0.5 | 0.5 | 0.5 | 0.5 | — | 0.5 | 0.5 | 0.5 |
| Suriinol104 | 0.5 | 0.5 | 0.5 | 0.5 | 0.5 | 0.5 | 0.5 | 0.5 | 0.5 |
| Newrex soft 58 | — | — | — | — | — | 0.5 | — | — | — |
| Triethanolamine | 1 | 1 | 1 | 1 | 1 | 1 | 1 | 1 | 1 |
| Ion exchanged water | Balance | Balance | Balance | Balance | Balance | Balance | Balance | Balance | Balance |
| Pigment content in ink composition | 10 | 10 | 10 | 10 | 10 | 10 | 7 | 7 | 7 |
| Water content in ink composition | 52 | 52 | 52 | 52 | 52 | 52 | 50 | 50 | 55 |

Preparation of Ink Set

The ink compositions prepared above were combined as shown in Table 2 to prepare ink sets.

TABLE 2

|  |  | Transfer direction Upstream -------------- Downstream | | | |
| --- | --- | --- | --- | --- | --- |
| Example 1 | Ink set 1 | Y1 | M1 | C1 | K1 |
| Example 2 | Ink set 2 | Y2 | C2 | M1 | K2 |
| Comparative Example | Ink set 3 | Y3 | M1 | C2 | K3 | hour, and then the lightness (L value) of patch portions of the pattern was measured with a GRETAG densitometer (manufactured by GretagMacbeth. The results are shown in Tables 3 to 5.

Test 3: Color Developability (Optical Density, OD Value)

The OD value of the patch pattern (solid image) printed at a duty of 100% in the same manner as in Test 2 was measured five times (five points) with GRETAG densitometer (manufactured by GretagMacbeth). The arithmetic mean of the OD value was calculated for each ink composition. The optical density was evaluated from the obtained average OD value according to the following criteria:

A: 1.2≤OD
B: 1.1 OD≤1.2
C: OD<1.1

The results are shown in Tables 3 to 5.

Test 4: Color Bleeding 1 (Sharpness of Characters 1)

A background including cyan, magenta and yellow colors and then black characters on the background were printed at a duty of 100% with the same ink jet printer as used in the above tests. Plain paper Xerox P (manufactured by Fuji Xerox) and Xerox 4024 (manufactured by Xerox) were used as recording media. The printed materials were allowed to stand under normal conditions for an hour, and then the bleeding of the black characters into the background was visually observed for each printed material and evaluated according to the following criteria:

A: No bleeding was observed.
B: Slight bleeding was observed, but was within an acceptable range.
C: Bleeding outside an acceptable range was observed.

The results are shown in Tables 3 to 5.

Test 5: Color Bleeding 2 (Sharpness of Characters 2)

Using the same ink jet printer as used in the above tests, a background was printed at a duty of 100% with an ink composition (single color, cyan or magenta) disposed at the upstream side, and then characters were printed on the background with an ink composition (single color, magenta or cyan) disposed at the downstream side. Plain paper Xerox P (manufactured by Fuji Xerox) and Xerox 4024 (manufactured by Xerox) were used as recording media. The printed materials were allowed to stand under normal conditions for an hour, and then the bleeding of the characters into the background was visually observed for each printed material and evaluated according to the following criteria:

A: No bleeding was observed.
B: Slight bleeding was observed, but within an acceptable range.
C: Bleeding outside an acceptable range was observed.

The results are shown in Tables 3 to 5.

Test 6: Feathering (Sharpness of Characters 3)

Black characters were printed on the white background of a recording medium, that is, directly on the recording medium, using the same ink jet printer as used above. Plain paper Xerox P (manufactured by Fuji Xerox) and Xerox 4024 (manufactured by Xerox) were used as recording media. The printed materials were allowed to stand under normal conditions for an hour, and then the bleeding of the characters into the white background was visually observed for each printed material and evaluated according to the following criteria. "Feathering" mentioned herein refers to a phenomenon of spreading ink from the edge of the printed portion on paper or a recording medium in a feather-like manner Since the pulp fiber is hydrophilic and porous, ink spreads along the length of the fibers, and thus this phenomenon occurs.

A: No feathering was observed.
B: Slight feathering was observed, but was within an acceptable range.
C: Feathering outside an acceptable range was observed.

The results are shown in Tables 3 to 5.

TABLE 3

| Example 1 | Ink composition | Y1 | M1 | C1 | K1 |
|---|---|---|---|---|---|
| | Yield value (mPa) | 0.22 | 0.28 | 0.43 | 1.49 |
| | Lightness | 88.9 | 53.1 | 45.0 | 23.0 |
| | OD value | A | A | A | A |
| | Character sharpness 1 | — | — | — | A |
| | Character sharpness 2 | — | 8 | 8 | — |
| | Character sharpness 3 | — | — | — | A |

TABLE 4

| Example 2 | Ink composition | Y2 | C2 | M1 | K2 |
|---|---|---|---|---|---|
| | Yield value (mPa) | 0.11 | 0.19 | 0.28 | 1.88 |
| | Lightness | 87.7 | 55.6 | 53.1 | 22.8 |
| | OD value | A | A | A | A |
| | Character sharpness 1 | — | — | — | A |
| | Character sharpness 2 | — | B | B | — |
| | Character sharpness 3 | — | — | — | A |

TABLE 5

| Comparative Example | Ink composition | Y3 | M1 | C2 | K3 |
|---|---|---|---|---|---|
| | Yield value (mPa) | 0.31 | 0.28 | 0.19 | 0.05 |
| | Lightness | 88.9 | 53.1 | 55.6 | 22.1 |
| | OD value | A | A | A | A |
| | Character sharpness 1 | — | — | — | C |
| | Character sharpness 2 | — | C | C | — |
| | Character sharpness 3 | — | — | — | B |

What is claimed is:

1. An ink set comprising one or more color ink compositions configured to form a first image and a black ink composition configured to form a second image on top of the first image, wherein the black ink composition has a higher yield value than the color ink compositions.

2. The ink set according to claim 1,
wherein the color ink compositions include a cyan ink composition, a magenta ink composition and a yellow ink composition, and
wherein the black ink composition has a yield value $Y_K$, the cyan ink composition has a yield value $Y_C$, the magenta ink composition has a yield value $Y_M$ and the yellow ink composition has a yield value $Y_Y$, and the yield values satisfy the relationship: $Y_K > Y_C > Y_M > Y_Y$.

3. The ink set according to claim 2, wherein the black ink composition and the color ink compositions include a pigment, a humectant, and 10% to 60% water by mass.

4. The ink set according to claim 3, wherein the concentration of the pigment contained in the black ink composition and the color ink compositions is 6% by mass or more.

5. The ink set according to claim 3, wherein the humectant is a mixture of compounds (A), (B) and (C) at a content mass ratio (A):(B):(C) of 1.0:0.1 to 1.0:1.0 to 3.5,
wherein A comprises at least one compound selected from glycerin, 1,2,6-hexanetriol, diethylene glycol, triethylene gycol, tetraethylene glycol, and dipropylene glycol,
wherein B comprises either trimethylol propane or trimethylol ethane, or a mixture thereof, and
wherein C comprises at least one compound selected from betaines, saccharides, and ureas and having a molecular weight in the range of from 100 to 200.

6. The ink set according to claim 1,
wherein the color ink compositions include a cyan ink composition, a magenta ink composition and a yellow ink composition, and
wherein the black ink composition has a yield value $Y_K$, the cyan ink composition has a yield value $Y_C$, the magenta ink composition has a yield value $Y_M$ and the yellow ink composition has a yield value $Y_Y$, and the yield values satisfy the relationship: $Y_K > Y_M > Y_C > Y_Y$.

7. The ink set according to claim 6, wherein the black ink composition and the color ink compositions include a pigment, a humectant, and 10% to 60% water by mass.

8. The ink set according to claim 7, wherein the concentration of the pigment contained in the black ink composition and the color ink compositions is 6% by mass or more.

9. The ink set according to claim 7, wherein the humectant is a mixture of compounds (A), (B) and (C) at a content mass ratio (A):(B):(C) of 1.0:0.1 to 1.0:100 to 3.5,
- wherein A comprises at least one compound selected from glycerin, 1,2,6-hexanetriol, diethylene glycol, triethylene glycol, tetraethylene glycol, and dipropylene
- wherein B comprises either trimethylol propane or trimethylol ethane, or a mixture thereof, and
- wherein C comprises at least one compound selected from betaines, saccharides, and ureas and having a molecular weight in the range of from 100 to 200.

10. The ink set according to claim 1, wherein the color ink compositions are disposed on an upstream side of a medium transport direction from the black ink composition.

11. An ink jet recording method comprising:
- ejecting a black ink composition and one or more color ink compositions onto a recording medium such that the black ink composition is deposited on top of the color ink compositions, wherein when the color ink compositions are deposited to form a first image and then the black ink composition is deposited to form a second image on the first image, the black ink composition has a higher yield value than the color ink compositions.

* * * * *